United States Patent [19]

Soat

[11] Patent Number: 5,117,806
[45] Date of Patent: Jun. 2, 1992

[54] ADJUSTABLE BARBECUE GRILL

[76] Inventor: Kerry D. Soat, 431 North McKemy #117, Chandler, Ariz. 85226

[21] Appl. No.: 529,666

[22] Filed: May 29, 1990

[51] Int. Cl.⁵ .................... F24B 1/182; A47J 37/07; F16L 3/00
[52] U.S. Cl. .................................. 126/29; 99/449; 248/122; 248/125; 248/156; 248/296
[58] Field of Search ............ 99/449, 450, 482, 421 H, 99/421 HH, 421 R, 419; 126/9 R, 9 B, 30, 25 R, 25 A, 25 AA; 248/122, 125, 156, 296; 411/351, 340, 341, 342, 343

[56] References Cited

U.S. PATENT DOCUMENTS

| 75,914 | 3/1868 | Holmes . | |
|---|---|---|---|
| 124,306 | 3/1872 | Wiley . | |
| 263,339 | 8/1882 | Humphrey . | |
| 306,063 | 10/1884 | Crosse . | |
| 347,306 | 8/1886 | Stambaugh . | |
| 347,992 | 8/1886 | Campbell . | |
| 353,339 | 11/1886 | White . | |
| 740,384 | 10/1903 | Barnes . | |
| 1,483,180 | 2/1924 | Keller | 403/378 |
| 1,820,950 | 9/1931 | Schulstadt | 403/108 |
| 2,039,541 | 5/1936 | Lekometros | 53/5 |
| 2,136,658 | 11/1938 | Westberg et al. | 53/5 |
| 2,173,024 | 9/1939 | Park | 126/9 R |
| 2,523,200 | 9/1950 | Durst | 126/30 |
| 2,545,005 | 3/1951 | Russell | 99/402 |
| 2,576,028 | 11/1951 | Mitchell | 99/397 |
| 2,764,223 | 9/1956 | Mischke | 248/418 |
| 2,826,981 | 3/1958 | Chick | 99/397 |
| 2,827,846 | 3/1958 | Karkling | 99/450 |
| 2,844,139 | 7/1958 | Lucas | 126/9 B |
| 2,894,447 | 7/1959 | Persinger et al. | 99/398 |
| 2,974,662 | 3/1961 | Forrest | 129/9 R |
| 3,043,209 | 7/1962 | Sutherland et al. | 99/397 |
| 3,152,536 | 10/1964 | Lucas | 99/397 |
| 3,181,453 | 5/1965 | Moran | 99/349 |
| 3,387,555 | 6/1968 | Moran | 99/421 |
| 3,537,388 | 11/1970 | Martin | 126/9 R |
| 4,351,312 | 9/1982 | Ivy | 126/9 R |
| 4,363,313 | 12/1982 | Smith | 126/9 R |
| 4,364,310 | 12/1982 | Rufkahr | 99/357 |

FOREIGN PATENT DOCUMENTS 654572 12/1962 Canada .................. 411/351

Primary Examiner—Harvey C. Hornsby
Assistant Examiner—Terrence R. Till
Attorney, Agent, or Firm—Don J. Flickinger; Jordan M. Meschkow; Lowell W. Gresham

[57] ABSTRACT

A barbecue grill structure having a grill portion for holding food over a fire, a support portion for supporting the grill portion over the fire and an adjustable attachment means for adjustably attaching the grill portion to the support portion.

7 Claims, 3 Drawing Sheets

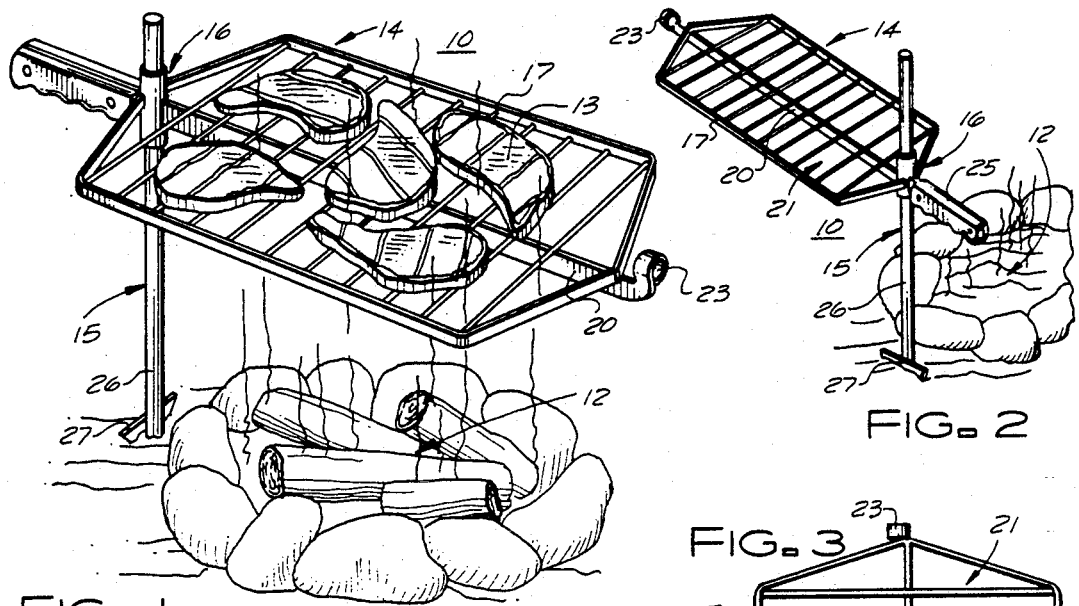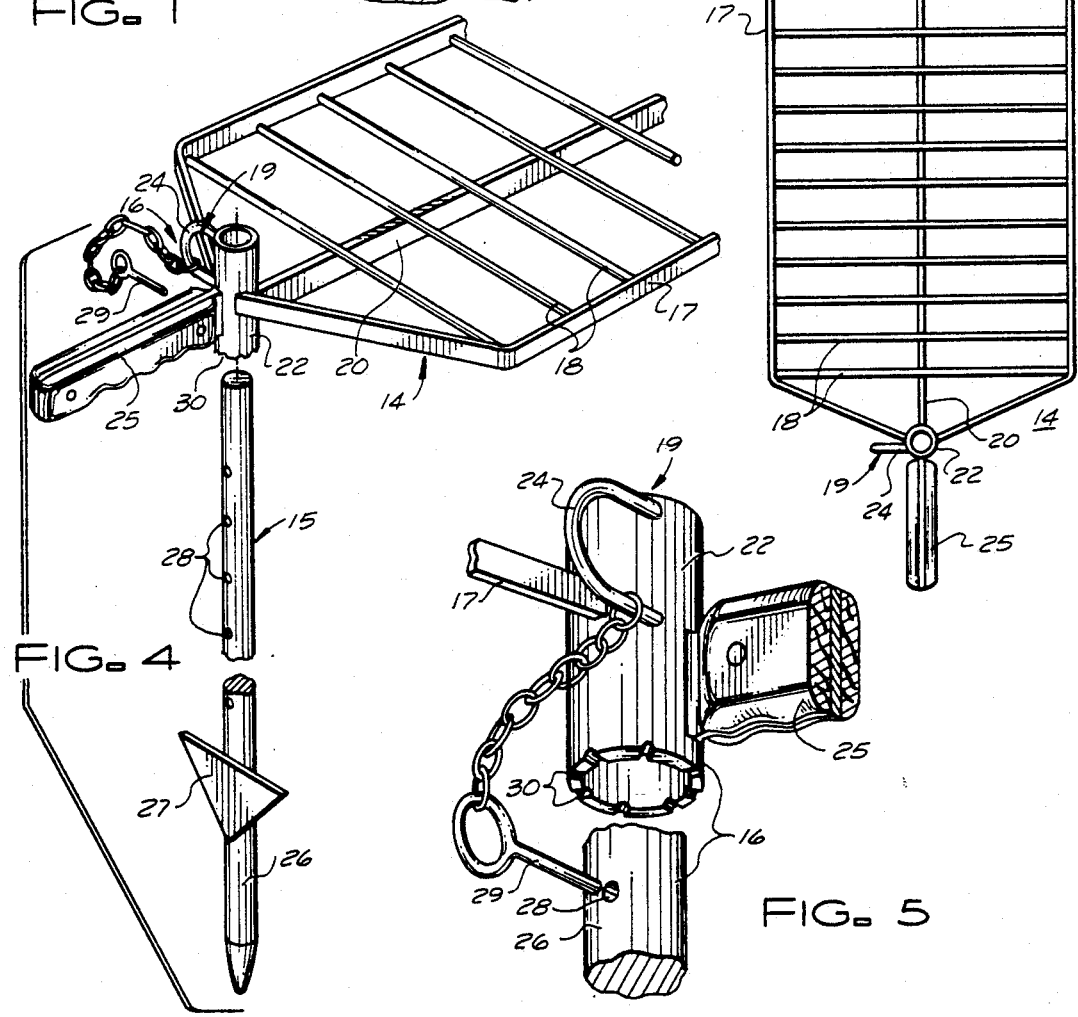

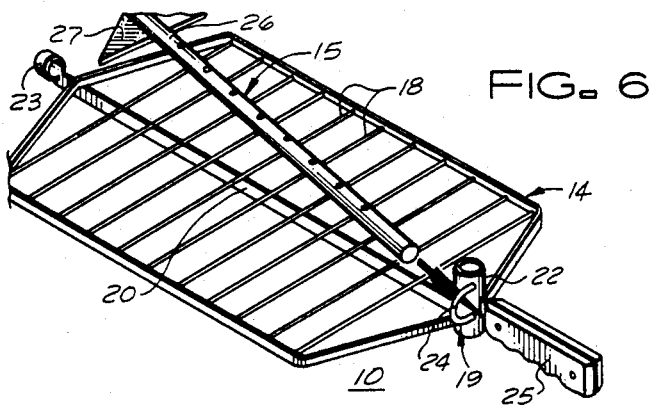
FIG. 6
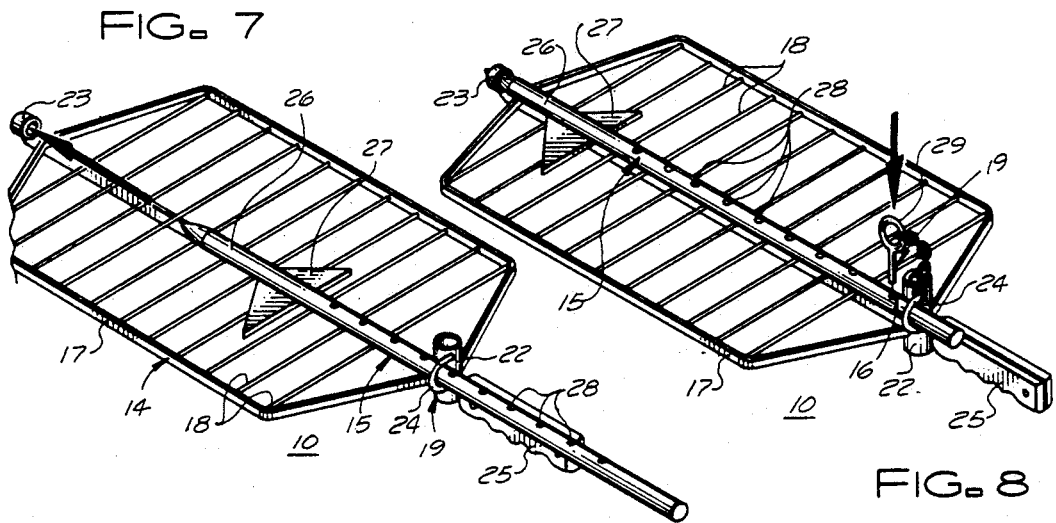
FIG. 7
FIG. 8
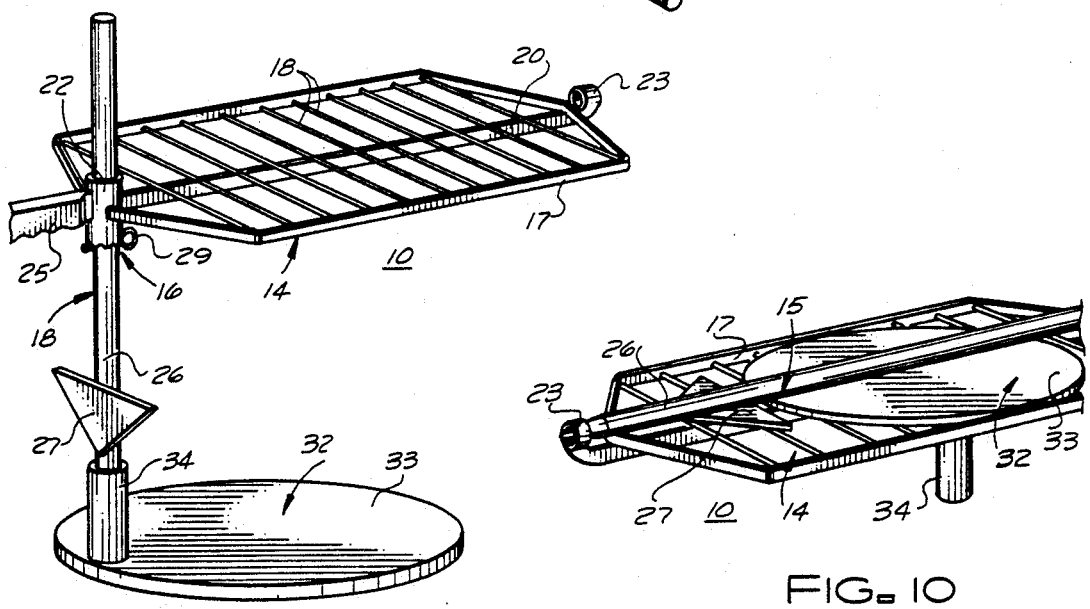
FIG. 9
FIG. 10

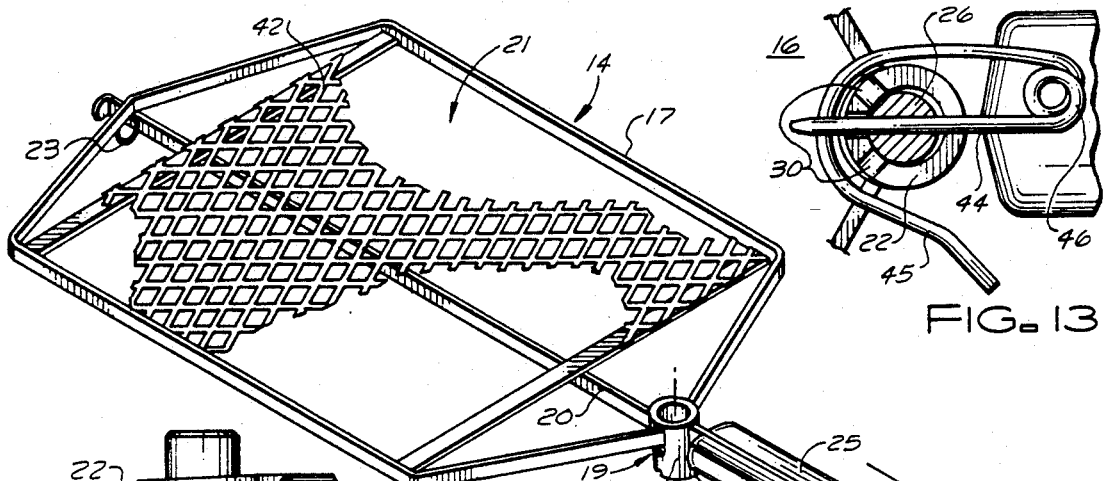
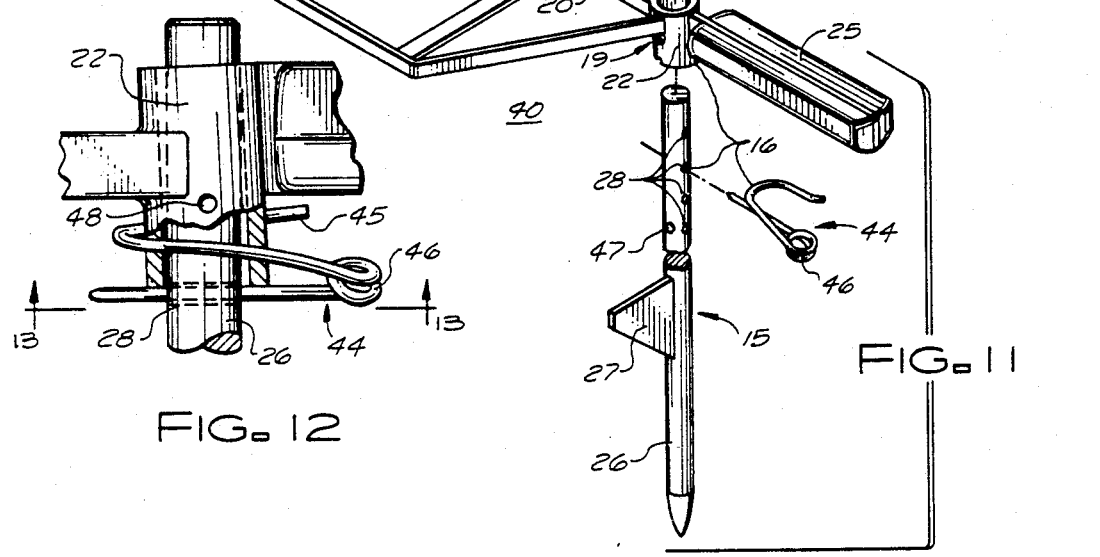
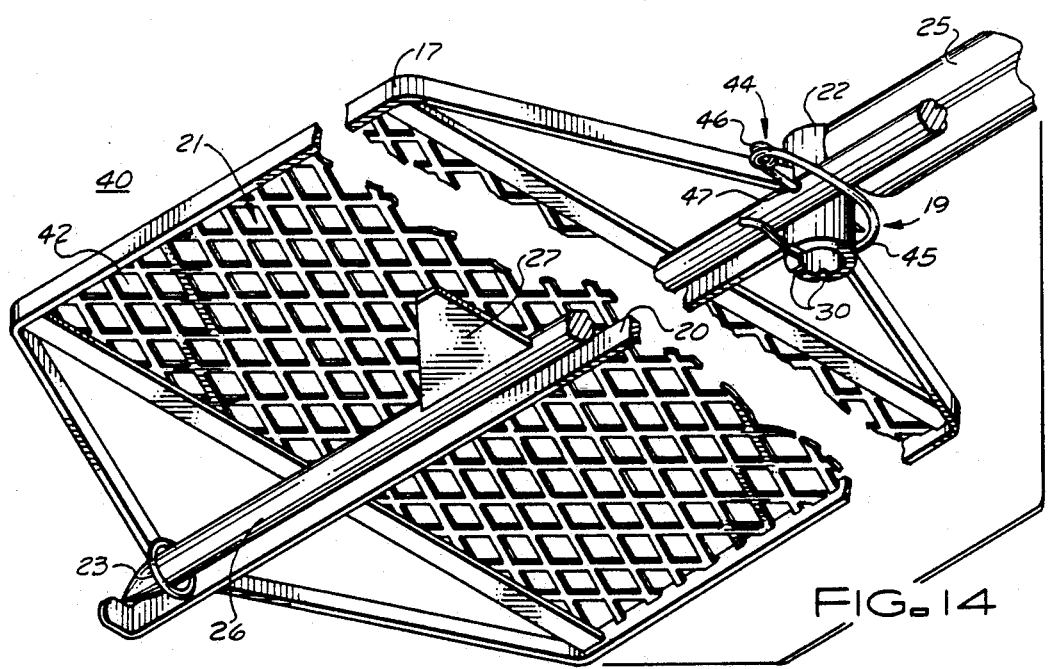

ADJUSTABLE BARBECUE GRILL

BACKGROUND OF THE INVENTION

1. Field of the Invention

This invention relates to a barbecue grill structure.

More particularly, the present invention relates to a portable grill structure for supporting food over a fire.

2. Prior Art

Barbecue grills for cooking food over a fire are well known. Typically barbecue grills are cumbersome and large. They are designed to contain and insulate a fire as well as hold food over that fire. In a backyard setting where transportation and storage are relatively unnecessary and a means is needed to contain a fire, these barbecue grills work very well. However, when camping, these types of grills would be very inconvenient. Their large size prohibits transportation in a vehicle.

While barbecue grills of the type mentioned above would not work in a camping or outing situation, and they are not needed. A fire is typically built on the ground with no need of a grill containing the fire.

Many campers are left with using an easily packed grill consisting of simple planar wire mesh. A fire is built, and the wire mesh is supported over the fire by placing rocks around the fire's perimeter and under the edges of the wire mesh. While this approach will work, and the wire mesh is easily stored and transported, the whole construction is unstable and unwieldy.

The requirement of using rocks or other props to support the wire mesh over the fire makes it difficult to adjust the height of the mesh over the fire and thus regulate cooking temperature. Also it may be difficult to keep the wire mesh in a flat position or keep it stable when food is placed on it. Further, removing or placing food on the wire mesh may be difficult if a hot fire is present underneath. The wire mesh, once placed on its supports over the fire, usually cannot be removed or replaced without causing more problems with stability.

It would be highly advantageous, therefore, to remedy the foregoing and other deficiencies inherent in the prior art.

Accordingly, it is an object of the present invention to provide a new and improved portable barbecue grill structure.

Another object of the present invention is to provide a portable grill structure that is easy to use.

And another object of the invention is to provide a portable grill structure that is compact for easy storage and transportation.

Still another object of the invention is to provide a portable grill structure that is adjustable.

Yet another object of the present invention is to provide a portable grill structure which is simple and inexpensive.

SUMMARY OF THE INVENTION

Briefly, to achieve the desired objects of the present invention in accordance with a preferred embodiment thereof, provided is a grill portion for supporting food, supported over a fire by a support portion. The grill portion is attached to the support portion by an adjustable attachment means consisting of a plurality of holes in the support portion into which a support pin is inserted. The grill portion slides onto the support member and rests on the support pin. The placement of the support pin into the holes in the support member determines the height of the grill portion.

BRIEF DESCRIPTION OF THE DRAWINGS

The foregoing and further and more specific objects and advantages of the instant invention will become readily apparent to those skilled in the art from the following detached description of preferred embodiments thereof taken in conjunction with the drawings, in which:

FIG. 1 is a perspective view of a portable grill structure, constructed in accordance with the teachings of the instant invention, as it would appear in use above a fire;

FIG. 2 is a perspective view of a portable grill structure illustrated in FIG. 1 with the grill portion adjusted away from a fire;

FIG. 3 is a top view of the grill portion of the present invention;

FIG. 4 is a perspective view of the grill portion being attached to the support portion;

FIG. 5 is a partial view of the present invention showing attachment means for adjustably attaching the grill component to the support component;

FIGS. 6-8 illustrate a perspective view of the steps involved in placing the present invention in its storage position;

FIG. 9 is a perspective view of the present invention showing the use of a base plate;

FIG. 10 is a perspective view showing the storage of the base plate with the storage of the portable grill structure illustrated in FIG. 8;

FIG. 11 is an exploded view of an alternate embodiment of the present invention;

FIG. 12 is a fragmentary view of the alternate embodiment showing the attachment means used in FIG. 11;

FIG. 13 is a bottom view of attachment means taken along line 13—132 of FIG. 12; and FIG. 14 is a perspective view of the storage position of the alternate embodiment of the present invention.

BRIEF DESCRIPTION OF THE PREFERRED EMBODIMENT

Turning now to the drawings in which like reference characters indicate corresponding elements throughout the several views, attention is first directed to FIG. 1 which illustrates a barbecue grill structure generally designated 10 set up over a fire 12 in a position to cook food 13. Barbecue grill structure 10 consists of a grill portion 14 which holds food 13 over a fire. Grill portion 14 is attached to a support portion 15 by adjustable attachment means 16. Support portion 15 supports grill portion 14 over fire 12 so food 13 can be cooked, as shown in FIG. 1. Adjustable attachment means 16 adjustably attaches grill portion 14 to support portion 15 so the height of grill portion 14 above fire 12 can be adjusted. Adjustable attachment means 16 also allows grill portion 14 to be turned, removing food 13 from over fire 12 as illustrated in FIG. 12.

FIG. 3 illustrates grill portion 14 which is comprised of a generally rectangular frame 17 which supports a grating 21, which in this embodiment consists of a plurality of parallel slats 18 extending thereacross. A central support beam 20 runs perpendicular to slats 18, under frame 17 to provide support to slats 18 and add support to frame 17. A tubular slide member 22 is attached to support frame 17 and central support beam 20 at one end forming a portion of attachment means 16. A support portion storage means for storing support portion 15, in this embodiment consists of a first storage ring 23 attached to central support beam 20. FIG. 1 illustrates how central beam 20 can itself be curved into first storage ring 23. However, those skilled in the art will understand that first storage ring 23 may be separate, and attached to central support beam 20 or frame 17. First support ring 23 is off center to one side of central support beam 20 and aligned with a second storage means 19, which in this embodiment is a second storage ring 24 attached to the side of tubular sliding member 22. A handle 25 is attached to tubular sliding member 22 opposite central support beam 20.

FIG. 4 shows grill portion 14 being placed on support portion 15. Support portion 15 consists of a cylindrical spike 26 having a plurality of holes 28 formed therethrough in a vertical row along its length. A planar, triangular shaped spade 27 is attached to the lower portion of spike 26 for aiding in inserting spike 26 into the ground. A person may step on the upper surface of spade 27 thereby aiding driving spike 26 into the ground. As illustrated in FIG. 4, tubular sliding member 22 slides over spike 26. Grill portion 14 is then secured in place by adjustable attachment means 16.

When tubular sliding member 22 is placed over spike 26 any horizontal or vertical tilting of grill portion 14 is prevented, and the height of grill portion 14 secured by adjustable attachment means 16.

FIG. 5 illustrates adjustable attachment means 16 which comprises a support pin 29, holding slots 30 and holes 28. When grill portion 14 is at the desired height, support pin 29 is inserted through one of holes 28 at the level desired. Tubular sliding member 22 sits on top of support pin 29 which prevents grill portion 14 from sliding down spike 26. A plurality of holding slots 30 formed on the bottom of tubular sliding member 22 fit over the ends of support pin 29 extending from spike 26 preventing rotation of grill portion 14. When rotation of grill portion 14 is desired, tubular sliding member 22 is lifted slightly and turned. When dropped back onto support pin 19, a different set of holding slots 30 will prevent rotation from the new position. In this embodiment a short segment of chain 3 attaches support pin 29 to second storage ring 23 to prevent the loss of support pin 29.

FIGS. 6-8 illustrate the support portion storage means for storing said support portion 15. In FIG. 6 the top of support portion 15 is inserted through second storage ring 24. The top of support portion 15 is passed through second storage ring 24 far enough to allow the opposite end of support portion 15 to be inserted into first storage ring 23. Support pin 29 is then inserted into top hole 28 to hold support portion 15 in place as illustrated in FIG. 8.

Referring to FIG. 9, barbecue grill structure 10 is shown with support portion 15 inserted into a base member 32 instead of the ground. In this embodiment base member 32 consists of a planar base 33 with a tubular socket 34 at an edge, extending upward therefrom. Spike 26 is inserted into socket 34.

FIG. 10 illustrates how base member 32 can be stored. Base 33 is laid on grill portion 14 with socket 34 extending down therethrough. Support portion 15 is then inserted over base member 32 as described in FIG. 6-8.

Turning now to FIG. 11, an alternate embodiment of the present invention, barbecue grill structure generally designated 40 is illustrated.

Alternate barbecue grill structure 40 is substantially identical to barbecue grill structure 10 but for alternate storage means 43 and a self locking support pin 44. Also, to illustrate how a variety of surfaces may be used, a mesh 42 is shown replacing slots 18 as grating 21. Those skilled in the art will understand that a variety of surfaces will be equally functional and may be used by preference.

Self locking support pin 44 is illustrated in FIGS. 12 and 13. When support pin 44 is inserted in the proper hole 28 to support grill portion 14, a hook 45 extending from a coil spring 46 at the base of support pin 44 may be snapped around tubular sliding member 22. This holds support pin 44 in place and prevents its accidental removal.

Second storage ring 24 is not present as second storage means 19 on tubular sliding member 22 in this embodiment, but is replaced by a first storage hole 47 formed in sliding member 22. A second storage hole 48 is formed in spike 26 and corresponds to first storage hole 47. Those skilled in the art will understand that one of adjustable holes 28 may be used instead of second storage hole. FIG. 14 shows how support portion 15 is stored. The lower end of spike 26 is inserted through first storage ring 23 along central support beam 20. Second storage hole 48 in spike 26 aligns with first storage hole 47 in tubular sliding member 22. When support pin 44 is inserted through holes 47 and 48, support portion 15 is securely fastened along central support beam 20. In this embodiment, spade 27 extends from only one side of spike 26. This allows spike 26 to lie flush along central support beam 20.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A barbecue grill structure comprising:
   a vertical support portion;
   a grill portion defining a plane and including
      a grating for supporting food,
      a frame supporting said grating,
      first coupling means for slidably and rotatably coupling said grill portion to said support portion such that the plane of said grill extends essentially perpendicular to said support portion to define a cooking configuration, said first coupling means comprising a tubular member attached to a first end of said frame and disposed for sliding movement on said support portion, and
   second coupling mean son said grill opposite said tubular member for coupling said grill portion to said support portion such that said plane extends essentially parallel to said support portion to define a storage configuration;
   dual-purpose holding means cooperating with said first coupling means to maintain said grill portion at a selectively variable vertical position relative to said support portion when said grill portion is in said cooking configuration and cooperating with said second coupling means to retain said grill structure in said storage configuration when said grill structure is not in use, said holding means including
  a plurality of vertically spaced apart holes in said support portion, and
  a holding pin for insertion through a selected one of said holes; and
a plurality of angularly spaced apart holding slots formed on the lower end of said tubular member whereby the angular orientation of said grill portion relative to said support portion is determined by aligning a selected one of said slots with said holding pin such that said slot receives said pin.

2. A barbecue grill structure according to claim 1, further comprising a handle attached to said tubular member opposite said frame.

3. A barbecue grill according to claim 1, wherein said second coupling means comprises:
  a first storage ring attached to said grill portion opposite said tubular member; and
  a second storage means for attaching said support portion to said tubular member.

4. A barbecue grill according to claim 3, wherein said second storage means is a second storage ring attached to said tubular member and aligned with said first storage ring.

5. A grill structure as claimed in claim 1, further comprising hook means resiliently secured to said holding pin for snapping around said tubular member to prevent accidental removal of said holding pin.

6. A grill structure as claimed in claim 5, wherein said hook means is integral with said holding pin.

7. A barbecue grill structure comprising:
  a vertical support portion;
  a grill portion defining a plane and including
    a grating for supporting food;
    a frame supporting said grating;
    first coupling means for slidably and rotatably coupling said grill portion to said support portion such that the plane of said grill extends essentially perpendicular to said support portion to define a cooking configuration, said first coupling means comprising a tubular member attached to a first end of said frame and disposed for sliding movement on said support portion, said tubular member having a lower edge, and
  second coupling means for coupling said grill portion to said support portion such that said plane extends essentially parallel to said support portion to define a storage configuration, said second coupling means including
    a first storage ring attached to said grill portion at the end opposite said tubular member, and
    a second storage ring for attaching said support portion to said tubular member, said second storage ring including a hole defined by said tubular member; and
  dual-purpose holding means cooperating with said first coupling means to maintain said grill portion at a selectively variable vertical position relative to said support portion when said grill portion is in said cooking configuration and cooperating with said second coupling means to retain said grill structure in said storage configuration when said grill structure is not in use, said holding means including a plurality of vertically spaced apart holes in said support portion and selectively alignable with said hole in said tubular member, and
  a holding pin for insertion through a selected one of said vertically spaced apart holes, said holding pin supporting said lower edge of said tubular member when said grill portion is in said cooking configuration and extending through said hole in said tubular member and an aligned, selected one of said vertically spaced apart holes in said support portion when said grill portion is in said storage configuration, said selected hole permitting the opposite end of said support portion to be inserted in the first storage ring.

* * * * *